US011087603B2

(12) United States Patent
Mizuno

(10) Patent No.: US 11,087,603 B2
(45) Date of Patent: Aug. 10, 2021

(54) INVENTORY MANAGEMENT SYSTEM AND WIRELESS TAG DEVICE

(71) Applicant: Zensho Holdings Co., Ltd., Tokyo (JP)

(72) Inventor: Seiichi Mizuno, Tokyo (JP)

(73) Assignee: Zensho Holdings Co., Ltd., Tokyo (JP)

( * ) Notice: Subject to any disclaimer, the term of this patent is extended or adjusted under 35 U.S.C. 154(b) by 0 days.

(21) Appl. No.: 16/749,164

(22) Filed: Jan. 22, 2020

(65) Prior Publication Data

US 2020/0219371 A1 Jul. 9, 2020

Related U.S. Application Data

(63) Continuation of application No. PCT/JP2018/028036, filed on Jul. 26, 2018.

(30) Foreign Application Priority Data

Jul. 28, 2017 (JP) .............................. JP2017-146920

(51) Int. Cl.
*G08B 13/00* (2006.01)
*G08B 13/24* (2006.01)
(Continued)

(52) U.S. Cl.
CPC .......... *G08B 13/2462* (2013.01); *G01G 23/20* (2013.01); *G01G 23/3728* (2013.01);
(Continued)

(58) Field of Classification Search
CPC ............ G08B 13/2462; G08B 13/1472; G08B 13/2417; G01G 23/20; G01G 23/3728;
(Continued)

(56) References Cited

U.S. PATENT DOCUMENTS

| | | | |
|---|---|---|---|
| 7,084,769 B2 | 8/2006 | Bauer et al. | |
| 8,976,029 B1 * | 3/2015 | McTigue | ............. G06Q 10/087 340/572.1 |

(Continued)

FOREIGN PATENT DOCUMENTS

| | | |
|---|---|---|
| CN | 101957904 A | 1/2011 |
| JP | H02-245968 A1 | 10/1990 |

(Continued)

OTHER PUBLICATIONS

English translation of International Preliminary Report on Patentability (Chapter I) (Application No. PCT/JP2018/028036) dated Feb. 6, 2020.

(Continued)

*Primary Examiner* — Ojiako K Nwugo
(74) *Attorney, Agent, or Firm* — Burr & Brown, PLLC

(57) ABSTRACT

An inventory management system according to an embodiment comprises: a weight measurer configured to measure a weight of a shelf on which an item can be placed; and an RF tag configured to transmit a wireless signal including information related to the weight measured by the weight measurer in response to a read request from a wireless device, wherein the RF tag includes a transceiver configured to generate power by a received electromagnetic wave or magnetic field and transmit the wireless signal to the wireless device by using the generated power, a storage configured to store therein the information related to the weight measured by the weight measurer, and a controller configured to cause the transceiver to transmit the wireless signal including the information related to the weight stored in the storage to the wireless device.

18 Claims, 5 Drawing Sheets

(51) Int. Cl.
  *G01G 23/20*  (2006.01)
  *G01G 23/37*  (2006.01)
  *G06Q 10/08*  (2012.01)
  *G08B 13/14*  (2006.01)

(52) U.S. Cl.
  CPC ....... *G06Q 10/087* (2013.01); *G08B 13/1472* (2013.01); *G08B 13/2417* (2013.01)

(58) Field of Classification Search
  CPC ........ G06Q 10/087; G06Q 10/08; G06K 7/10; G06K 19/07; A47F 1/00; B65G 1/137
  See application file for complete search history.

(56) References Cited

U.S. PATENT DOCUMENTS

2006/0164247 A1* 7/2006 Overhultz ............... A47F 10/02
                                                       340/572.1
2007/0050271 A1* 3/2007 Ufford ................. G06Q 10/087
                                                          705/28
2016/0132821 A1   5/2016 Glasgow et al.

FOREIGN PATENT DOCUMENTS

| | | |
|---|---|---|
| JP | 2004-338926 A1 | 12/2004 |
| JP | 2004-359363 A1 | 12/2004 |
| JP | 2005-112530 A1 | 4/2005 |
| JP | 2006-023788 A1 | 1/2006 |
| JP | 2014-152018 A1 | 8/2014 |
| KR | 10-2010-0003343 A | 1/2010 |

OTHER PUBLICATIONS

International Search Report and Written Opinion (Application No. PCT/JP2018/028036) dated Oct. 16, 2018.
Chinese Office Action (with English translation), Chinese Application No. 201880049192.1, dated Jan. 21, 2021.

* cited by examiner

INVENTORY MANAGEMENT SYSTEM AND WIRELESS TAG DEVICE

CROSS-REFERENCE TO RELATED APPLICATIONS

This application is a continuation application of International Application No. PCT/JP2018/028036, filed Jul. 26, 2018, which claims priority to Japanese Patent Application No. 2017-146920, filed Jul. 28, 2017. The contents of these applications are incorporated herein by reference in their entirety.

FIELD

The embodiments of the present invention relate to an inventory management system and wireless tag device.

BACKGROUND

In restaurants and supermarkets, if items such as commodities and materials demanded by customers and clients become out of stock, the sales may decrease to lose sales opportunities, or may cause trouble to customers or the like to lose credit. Meanwhile, excess stock of items may increase unprofitable assets. In view of such circumstances, a commodity management system that manages commodities efficiently has been proposed (see Japanese Patent Application Laid-open No. 2014-152018).

In a commodity management system disclosed in Japanese Patent Application Laid-open No. 2014-152018, the quantity and the type of commodities are calculated based on a weight change of a store shelf provided with a weight sensor, and a calculation result is transmitted from a transmitter to a server via the Internet.

However, in the commodity management system disclosed in Japanese Patent Application Laid-open No. 2014-152018, it is necessary to transmit weight data to a web server via the Internet, and the cost generated by data transmission and the load on the communication line largely increase.

Further, wireless data transmission generally has large power consumption, and if a transmitter is attached to each store shelf, considerable power consumption occurs in the entire store.

Further, in a case where a weight sensor and a transmitter are installed for each store shelf, the facility cost of the entire store largely increases.

Therefore, an object of the present invention is to provide an inventory management system and a wireless tag device that can perform inventory management of items for each shelf with a small facility cost.

DETAILED DESCRIPTION

Figure 1:
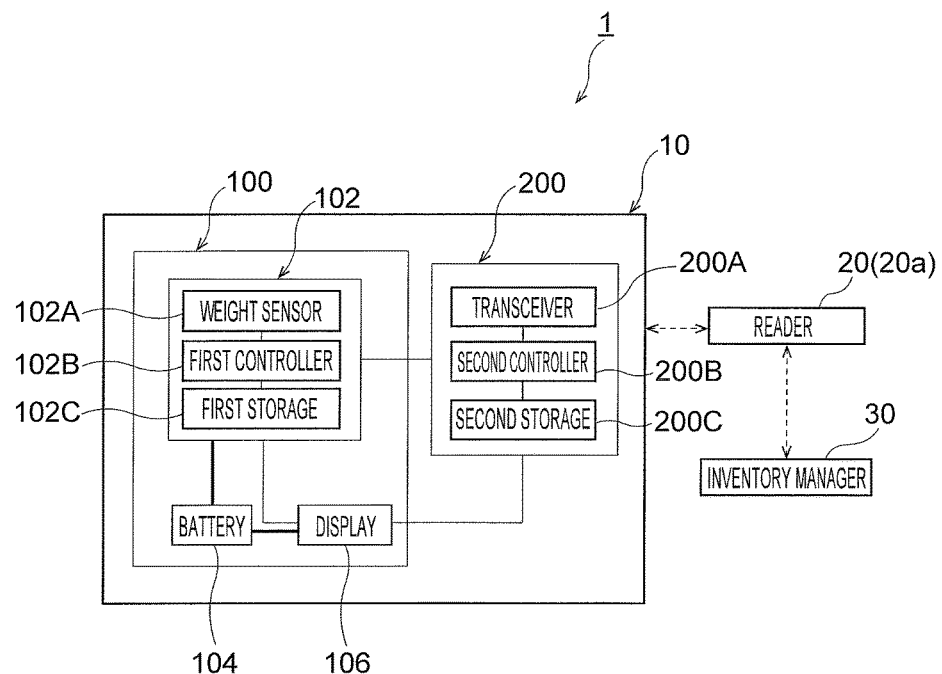
FIG. 1 is a block diagram illustrating an inventory management system according to a first embodiment.

An inventory management system according to an embodiment comprises: a weight measurer configured to measure a weight of a shelf on which an item can be placed; and an RF tag configured to transmit a wireless signal including information related to the weight measured by the weight measurer in response to a read request from a wireless device, wherein the RF tag includes a transceiver configured to generate power by a received electromagnetic wave or magnetic field and transmit the wireless signal to the wireless device by using the generated power, a storage configured to store therein the information related to the weight measured by the weight measurer, and a controller configured to cause the transceiver to transmit the wireless signal including the information related to the weight stored in the storage to the wireless device.

The controller may calculate number of the items placed on the shelf based on the information related to the weight, and cause the transceiver to transmit the wireless signal including the information of the number to the wireless device.

The weight measurer may measure a weight of the shelf regularly or irregularly, the storage may store therein the weight of the shelf measured by the weight measurer regularly or irregularly, together with information related to a measurement time of the weight, and the controller may cause the transceiver to transmit the wireless signal including the information related to the weight stored in the storage, and the information related to the measurement time in response to a read request from the wireless device.

Plural types of items can be placed on the shelf, the weight measurer may measure a weight of the shelf regularly or irregularly, and the controller may calculate number of items placed on the shelf for each type of items, based on a change in the weight measured by the weight measurer regularly or irregularly, store the number of items in the storage, and cause the transceiver to transmit the wireless signal including the number of items for each type of items, which is stored in the storage, in response to a read request from the wireless device.

The weight measurer may measure a weight of the shelf based on an instruction signal from the controller, and the controller may transmit the instruction signal to the weight measurer based on at least one of a calculation result of the number of items and environment conditions.

The environment conditions may include at least one of the weather, the temperature, the humidity, the time slot, the day of the week, and the type of items.

The storage may store therein the information related to the weight by using power generated by the transceiver.

The weight measurer may include a display capable of displaying information related to items placed on the shelf.

The transceiver may receive information related to the item to be displayed on the display from the wireless device, the controller may transmit the received information related to the item to the weight measurer, and the weight measurer may cause the display to display the information related to the item transmitted from the controller.

An inventory manager configured to manage items placed on the shelf based on the wireless signal received by the wireless device may further be included.

The wireless device may be included in at least one of a handy terminal, a self-running robot, and a shopping cart.

The wireless device and the transceiver may transmit and receive the wireless signal to and from each other within a communication distance of 1 meter or more.

The weight measurer and the RF tag are provided in each of the shelves, and the wireless device may issue a read request to the RF tag of each of the shelves at a same timing.

A wireless tag device according to the embodiment comprises: a transceiver configured to generate power by an electromagnetic wave or a magnetic field received from a wireless device and transmit a wireless signal in response to a read request from the wireless device by using the generated power; a storage configured to store therein information related to a weight of a shelf on which an item can be placed, which is measured by a weight measurer, by using power generated by the transceiver; and a controller configured to cause the transceiver to transmit the wireless signal including the information related to the weight stored in the storage to the wireless device.

According to the present invention, it is possible to provide an inventory management system and a wireless tag device that can perform inventory management of items for each shelf with a small facility cost. A wireless communication system according to an embodiment comprises a first wireless communication device and a second wireless communication device. The first wireless communication device is configured to transmit a signal related to firmware. The second wireless communication device is configured to compute an angle of departure from the first wireless communication device based on a radio wave transmitted from the first wireless communication device, and to perform updating of the firmware when a computed angle of departure is a predetermined angle.

An inventory management system and a wireless tag device according to embodiments of the present invention will now be explained below in detail with reference to the accompanying drawings. The embodiments described below are only examples of the embodiments of the present invention and it should not be construed that the present invention is limited to the embodiments. In the drawings referred to in the embodiments, like parts or parts having identical functions are denoted by like or similar reference characters and there is a case where redundant explanations thereof are omitted. Further, for convenience of explanation, there are cases where dimensional ratios of the parts in the drawings are different from those of actual products and some part of configurations is omitted from the drawings.

First Embodiment

Figure 2:
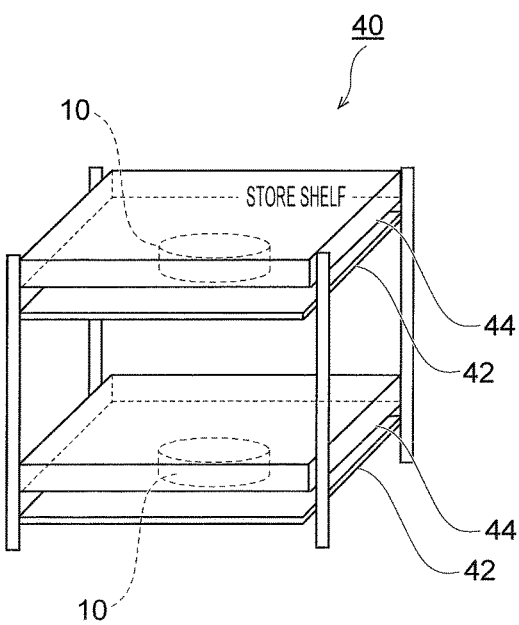
FIG. 2 is a diagram illustrating an example of a store shelf according to the first embodiment.

FIG. 1 is a block diagram illustrating an inventory management system 1 according to a first embodiment. The inventory management system 1 is a system that manages an inventory of items placed on a shelf. Here, the item is typically a commodity, and is a concept also including items other than items and materials for a sales purpose. FIG. 2 is a diagram illustrating an example of a store shelf according to the first embodiment. As illustrated in FIG. 1 and FIG. 2, the inventory management system 1 according to the embodiment of the present invention is configured to include a weight measurement system 10, a wireless device 20, and an inventory manager 30.

The weight measurement system 10 is a system that measures the weight of a shelf on which items can be placed, and includes a weight measurer 100 and an RF tag 200. The weight measurer 100 measures the weight of a shelf 44 on which items can be placed, and displays information related to the items. The RF tag 200 is an information medium that reads and writes data in an incorporated memory in a non-contact manner by using an electromagnetic wave or a magnetic field. The RF tag 200 is a passive IC tag, and transmits a wireless signal including information related to the weight measured by the weight measurer 100 in response to a read request from the wireless device 20. Detailed configurations of the weight measurer 100 and the RF tag 200 are described later.

The wireless device 20 is, for example, a reader 20a for an RF tag. The reader 20a is an electronic device for importing data from the RF tag 200. More specifically, the wireless device 20 acquires information related to the weight from the RF tag 200 by wireless communication using an electromagnetic wave or a magnetic field. Further, the wireless device 20 transmits a wireless signal including information related to the weight acquired from the RF tag 200 to the inventory manager 30.

The electromagnetic wave or the magnetic field transmitted from the wireless device 20 to the weight measurement system 10 has electric, electromagnetic, or magnetic energy, and the energy is wirelessly transmitted to the RF tag 200, so that the RF tag 200 generates power. Accordingly, a battery is not required, thereby enabling to reduce power consumption. Further, even if a battery is provided supplementarily, the battery replacement interval can be extended, thereby enabling to reduce the cost required for battery replacement. This allows reduction of power consumption, and battery replacement becomes unnecessary or the battery replacement interval can be extended, and the cost required for battery replacement can be reduced.

The inventory manager 30 is, for example, a server installed in a store, and manages items to be placed on a shelf based on a wireless signal received from the wireless device 20. The inventory manager 30 sequentially records information of chronological changes, for example, of the number of items placed on a shelf, and displays the information on a monitor or the like (not illustrated). Further, the inventory manager 30 transmits a request command with respect to the weight measurement system 10 to the wireless device 20. Thus, communication between the wireless device 20 and the inventory manager 30 is performed by data transmission by wireless communication. However, as compared with a case where a transmitter is attached to each store shelf, the facility cost of the transmitter and the cost of power consumption by data transmission can be reduced. Since information is processed by the server in the store, the load on the communication line can be decreased as compared with a case where the information is transmitted to the web server via the Internet.

As illustrated in FIG. 2, a store shelf 40 includes a plurality of support plates 42 and a plurality of shelves 44. The support plate 42 is for supporting the weight measurement system 10 including the weight measurer 100. An upper surface of the weight measurer 100 is a flat surface, and the shelf 44 is placed on the upper surface. This enables that the upper surface of the weight measurer 100 receives the weight of the shelf 44. Although not illustrated in FIG.

2, a fastener or the like for suppressing clattering of the shelf 44 can be provided, for example, at four corners of the shelf 44.

One or a plurality of types of items can be placed on the upper surface of the shelf 44. The weight measurer 100 measures the weight of the own weight of the shelf 44 and the weight of all the items placed on the shelf 44 added together.

Detailed configurations of the weight measurer 100 and the RF tag 200 are described here based on FIG. 1, with reference to FIG. 2. As illustrated in FIG. 1, the weight measurer 100 measures the weight of the shelf 44 on which items can be placed. The weight measurer 100 is configured to include a weight sensor portion 102, a battery 104, and a display 106.

The weight sensor portion 102 measures the weight of the shelf 44 on which items can be placed and stores the weight therein. The weight sensor portion 102 is configured to include a weight sensor 102A, a first controller 102B, and a first storage 102C.

The weight sensor 102A is arranged below the shelf 44 to measure the weight of the shelf 44. The weight sensor 102A is configured by, for example, a load cell sensor, and outputs a measurement signal corresponding to a force applied to the sensor to the first controller 102B.

The first controller 102B is, for example, an MPU (Micro Processing Unit), and controls the entire weight measurer 100. For example, the first controller 102B controls the weight sensor 102A so as to measure the weight of the shelf 44 at every predetermined interval set in advance. Alternatively, the first controller 102B may cause the weight sensor 102A to measure the weight of the shelf 44 regularly or irregularly, based on an instruction signal from the RF tag 200. The first controller 102B stores the information of the measured weight together with information of the measured date and time chronologically in the first storage 102C. Further, the first controller 102B causes the weight sensor 102A to measure the weight of the shelf 44 at every 20 minutes, for example, if the instruction signal is "measurement at every 20 minutes". Further, the first controller 102B may acquire the measured weight information from the first storage 102C and display the information on the display 106.

The first storage 102C is, for example, a non-volatile memory. The first storage 102C stores therein information related to at least the weight of items. Further, the first storage 102C can store therein information related to the weight measurement time together at the time of storing the information related to the weight of items. Further, display information to be displayed on the display 106 and the like can be stored in the first storage 102C. The battery 104 is, for example, a button cell, and supplies power to the weight sensor portion 102 and the display 106.

The display 106 is, for example, an LCD (Liquid Crystal Display) or an electronic paper and displays, for example, alphabet characters based on a control signal from the first controller 102B or a second controller 200B. The display 106 displays, for example, the item name and the price of an item as the information related to the items placed on the shelf 44. The display 106 can be omitted, since it is not an essential constituent component.

The RF tag 200 is configured to include a transceiver 200A, the second controller 200B, and a second storage 200C. The wireless tag device according to the present embodiment corresponds to the RF tag 200.

The transceiver 200A generates power by a received electromagnetic wave or magnetic field and transmits a wireless signal by using the generated power. The transceiver 200A according to the present embodiment performs wireless communication by a radio system using, for example, radio waves in a UHF band, and includes an antenna and a circuit portion (not illustrated). The antenna receives the electromagnetic wave transmitted from the wireless device 20 and generates power by using an antenna inductor. Further, the antenna transmits a wireless signal modulated by a carrier signal of a predetermined frequency generated by the transceiver 200A. In a case where wireless communication is performed by using the radio system, the radio waves transmitted to the space by the wireless device 20 are received by the antenna of the transceiver 200A to generate power.

The circuit portion of the transceiver 200A performs demodulation of the wireless signal received by the antenna, generates a read request signal from the wireless device 20 and an information signal related to control, and outputs the signals to the second controller 200B. Further, the circuit portion of the transceiver 200A rectifies the power generated by the antenna and supplies power to the second controller 200B and the second storage 200C. Further, the circuit portion modulates a wireless signal transmitted from the antenna. The transceiver 200A may perform wireless communication according to an electromagnetic induction method. That is, the transceiver 200A generates power by the received electromagnetic wave or magnetic field and transmits a wireless signal by using the generated power.

The second controller 200B is, for example, an MPU, and controls the entire RF tag 200 in response to a read request from the wireless device 20. For example, the second controller 200B generates a wireless signal including the information related to the weight stored in the second storage 200C in response to a read request from the wireless device 20, and causes the transceiver 200A to transmit the wireless signal to the wireless device 20.

Further, the second controller 200B calculates the number of items placed on the shelf 44 based on the information related to the weight stored in the second storage 200C in response to a read request from the wireless device 20, and causes the transceiver 200A to transmit a wireless signal including the number information to the wireless device 20.

The second storage 200C is, for example, a non-volatile memory. The second storage 200C stores therein specific information of the RF tag 200, and the information related to the weight read from the weight sensor portion 102.

The configuration according to the present embodiment has been described above. An operation example of the weight measurement system 10 is described below in detail.

Figure 3:
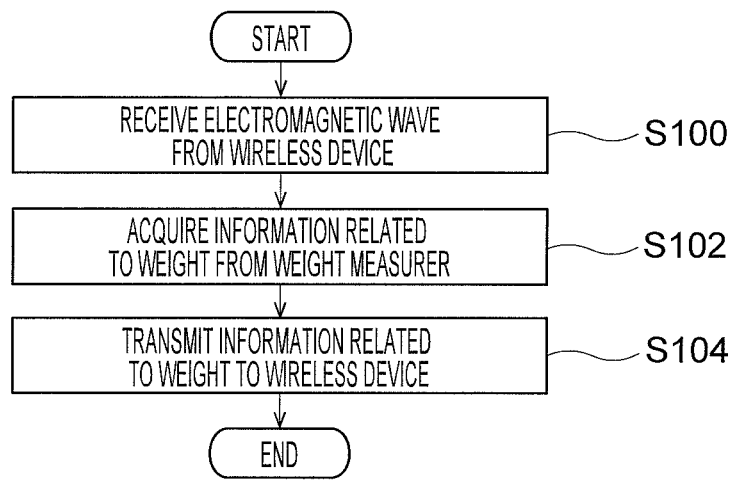
FIG. 3 is a flowchart for explaining an operation example of the inventory management system according to the first embodiment.

FIG. 3 is a flowchart for explaining a processing operation of the weight measurement system 10 according to the first embodiment. An example in which information related to the weight of the shelf 44 is transmitted to the wireless device 20 in response to a read request from the wireless device 20 is described here. FIG. 3 illustrates an example in which the wireless device 20 transmits an electromagnetic wave including a read request.

First, the transceiver 200A in the RF tag 200 receives an electromagnetic wave from the wireless device 20 (Step S100). The antenna of the transceiver 200A generates power for activating the circuit portion of the transceiver 200A, the second controller 200B, and the second storage 200C, by the energy included in the received electromagnetic wave. Subsequently the circuit portion of the transceiver 200A uses the power to demodulate a modulation wave to generate a first request signal.

The antenna of the transceiver 200A supplies the generated power to the circuit portion of the transceiver 200A, the second controller 200B, and the second storage 200C, while receiving the electromagnetic wave. Accordingly, the RF tag 200 performs the operation by using power generated by the energy supplied from the wireless device 20, while receiving the electromagnetic wave.

Next, the second controller 200B acquires information related to the weight of items from the weight measurer 100 by using power generated by the received electromagnetic wave and stores the information in the second storage 200C (Step S102). More specifically, the second controller 200B acquires the information related to the weight of items stored chronologically in the first storage 102C of the weight sensor portion 102 from the first storage 102C, and similarly stores the information chronologically in the second storage 200C.

Next, the second controller 200B generates a wireless signal including the information related to the weight of items acquired from the second storage 200C and causes the transceiver 200A to transmit the wireless signal to the wireless device 20 (Step S104). More specifically, the second controller 200B generates a wireless signal including the information related to the weight, and causes the transceiver 200A to transmit the wireless signal to the wireless device 20, using a reflected wave of the electromagnetic wave as a carrier wave.

In this manner, the second controller 200B is activated in response to a read request from the wireless device 20, and stores information related to the weight of items chronologically in the second storage 200C, by using power generated by an electromagnetic wave received from the wireless device 20. The second controller 200B generates a wireless signal including information related to the weight of items by the power generated by the received electromagnetic wave, and causes the transceiver 200A to transmit the wireless signal to the wireless device 20. In this manner, the RF tag 200 operates by energy supplied from the wireless device 20, thereby enabling to transmit information related to the weight of the shelf 44 to the wireless device 20 without requiring an external power source.

Figure 4:
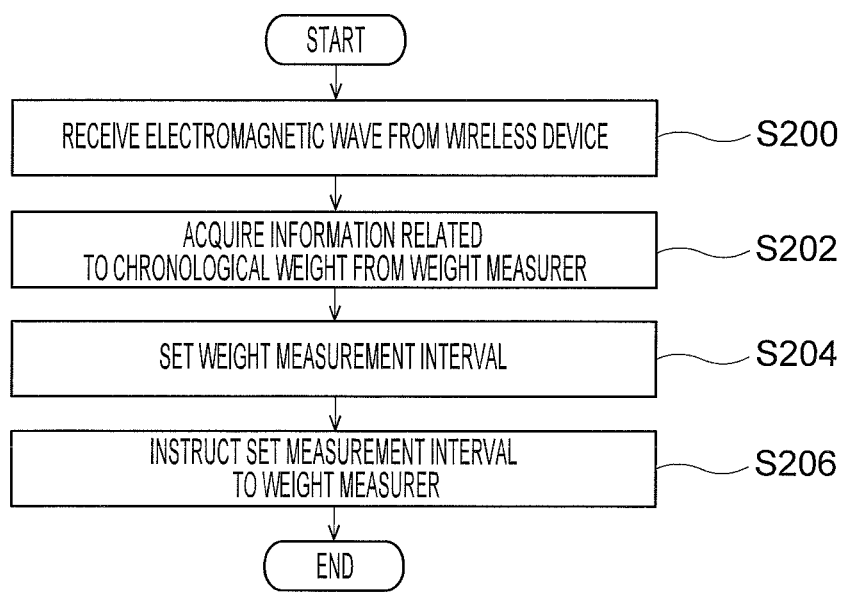
FIG. 4 is a flowchart for explaining an operation example of the inventory management system in a case where there is a change in the weight measured by a weight measurement device.

FIG. 4 is a flowchart for explaining an example in which an interval of weight measurement performed by the weight sensor portion 102 is instructed by the RF tag 200.

As illustrated in FIG. 4, the transceiver 200A receives an electromagnetic wave from the wireless device 20 (Step S200). Accordingly, similarly to Step S100 (FIG. 3), the transceiver 200A generates power for activating the circuit portion of the transceiver 200A, the second controller 200B, and the second storage 200C by the received electromagnetic wave. Subsequently the circuit portion of the transceiver 200A uses the power to demodulate a wireless signal to generate a request signal.

Next, the second controller 200B acquires information related to the chronological weight of items from the weight measurer 100 based on the request signal (Step S202). More specifically, the second controller 200B acquires information of the weight of the shelf 44 stored chronologically for every measurement time from the first storage 102C, and stores the information of the weight of the shelf 44 chronologically in the second storage 200C for every measurement time.

Subsequently, the second controller 200B calculates the number of items placed on the shelf 44 for each type of items based on a change in the weight of the shelf 44 stored in the second storage 200C, and stores the number of items in the second storage 200C. For example, in a case where the weight of an item A is 1 kilogram and the weight of an item B is 1.3 kilograms, if a change in the weight is −5.9 kilograms, it is calculated that the number of the item A is −2, and the number of the item B is −3. In this manner, by chronologically adding the changed number of items for each type of items, the number of items placed on the shelf 44 can be acquired for each type of items, corresponding to the measurement time.

Next, the second controller 200B sets a weight measurement interval (Step S204). More specifically, the second controller 200B sets the weight measurement interval based on at least one of the calculation result of the number of items and environment conditions. For example, the second controller 200B sets the measurement interval based on a time interval during which a change occurs in the number of items. The second controller 200B sets a longer measurement interval, as the time interval during which a change has occurred becomes longer. On the contrary, the second controller 200B sets a shorter measurement interval, as the time interval during which a change has occurred becomes shorter. Accordingly, a measurement interval corresponding to the time interval during which a change has occurred in the number of items can be set.

Meanwhile, the environment conditions include at least one of the weather, the temperature, the humidity, the time slot, the day of the week, and the type of items. A relation between the environment conditions and an increase or decrease of an item can be obtained beforehand based on the statistics. For example, in a case where the item is drinking water, the measurement interval is set to be shorter, because there is a tendency that the number of sales of the item increases on a fine day or a hot day.

Next, the second controller 200B transmits an instruction signal including information of the set measurement interval to the first controller 102B (Step S206). This enables the first controller 102B to measure the weight of the shelf 44 according to the measurement interval based on the instruction signal. The second controller 200B generates a wireless signal including information of the number per item for each measurement time acquired from the second storage 200C, in response to a first read request from the wireless device 20, and causes the transceiver 200A to transmit the wireless signal to the wireless device 20.

In this manner, the second controller 200B sets a measurement interval of the weight measurer 100, based on at least one of the calculation result of the number of items placed on the shelf 44 and the environment conditions. Accordingly, since the weight measurement interval can be adjusted according to the number of items and the environment conditions, the power consumption of the weight measurement system 10 can be suppressed.

As described above, according to the present embodiment, when there is a read request from the wireless device 20, the RF tag 200 transmits a wireless signal including information related to the weight of the shelf 44 measured by the weight measurer 100 to the wireless device 20 by using energy of an electromagnetic wave or a magnetic field transmitted from the wireless device 20. Therefore, inventory management of items for each shelf 44 can be performed with less facility cost.

Second Embodiment

Figure 5:
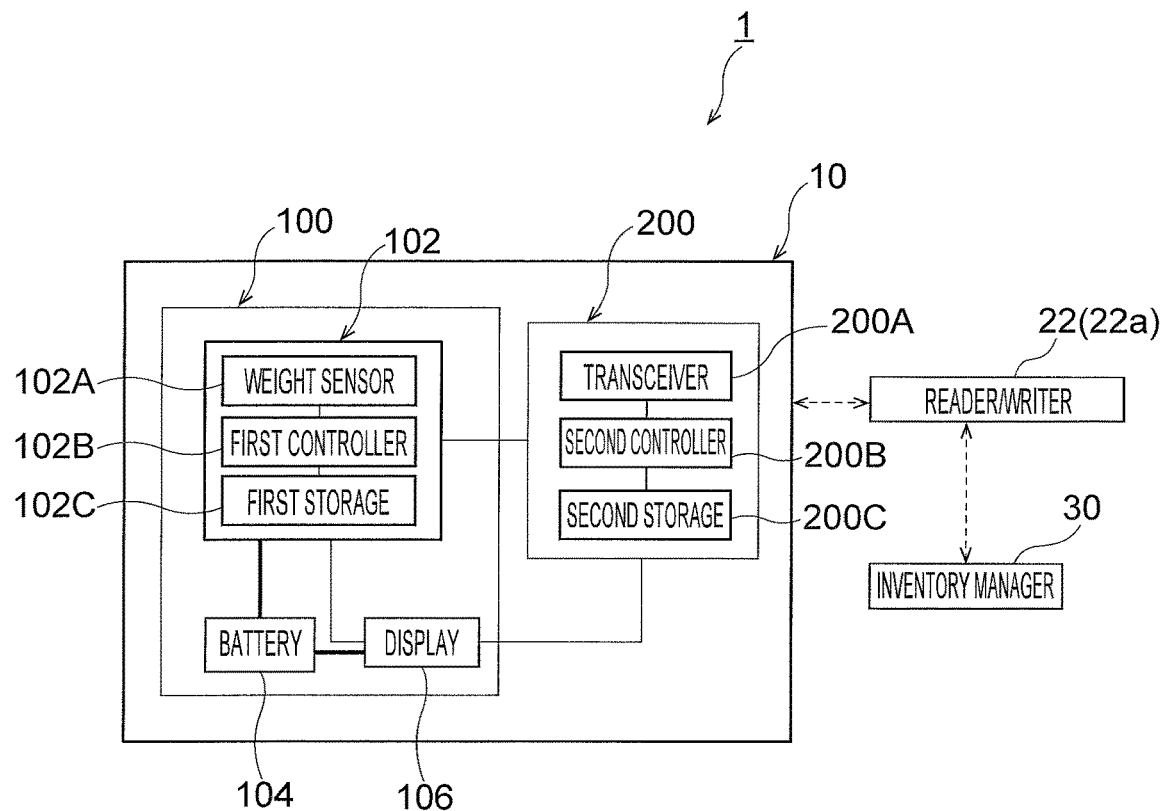
FIG. 5 is a block diagram illustrating an inventory management system according to a second embodiment.

FIG. 5 is a block diagram illustrating an inventory management system 1 according to a second embodiment. A wireless device 22 according to the second embodiment differs from the wireless device 20 according to the first embodiment in that the wireless device 22 further has a write function to the RF tag 200. Here, differences between the wireless device 22 according to the second embodiment and the wireless device 20 according to the first embodiment are described and explanations of other parts are omitted.

As illustrated in FIG. 5, the wireless device 22 is, for example, a reader/writer 22a for an RF tag and also has a write function to the RF tag 200. The reader/writer 22a is an electronic device for performing a process to import data from the RF tag 200 and in some cases, to transmit the data to the RF tag 200. That is, the wireless device 22 receives a wireless signal including information to be written in the RF tag 200 from the inventory manager 30, and writes the information included in the wireless signal in the RF tag 200. The information to be written in the RF tag 200 is, for example, information related to an item placed on the shelf 44, which is hereinafter referred to as "item information". The information to be written in the RF tag 200 may include information other than the item information.

Figure 6:
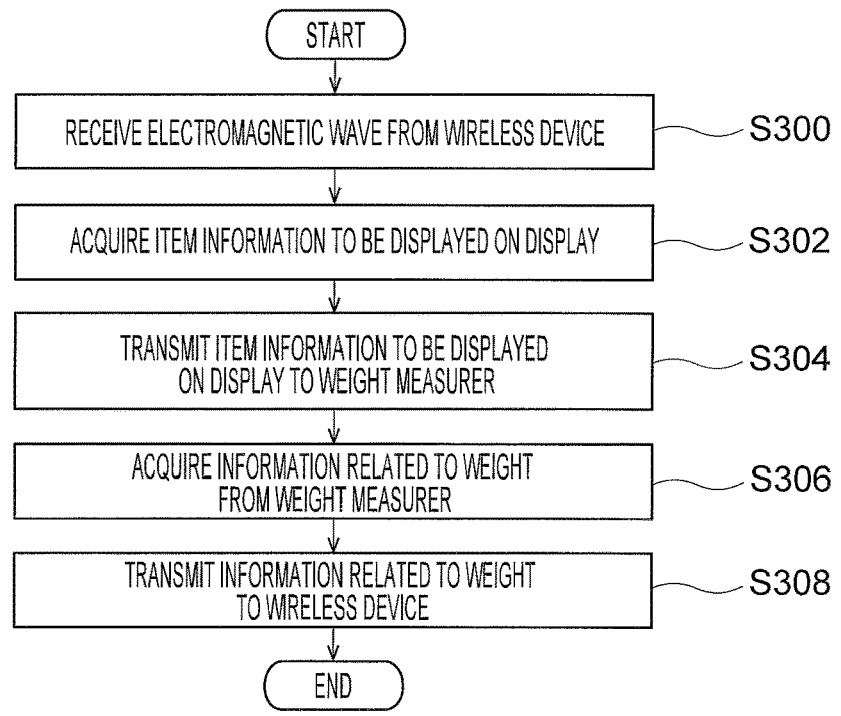
FIG. 6 is a flowchart for explaining an example of write and read operations of a wireless device.

FIG. 6 is a flowchart for explaining an example of write and read operations of the wireless device 22. As illustrated in FIG. 6, the transceiver 200A receives an electromagnetic wave from the wireless device 20 (Step S300). Accordingly, the transceiver 200A first generates power for activating the circuit portion of the transceiver 200A, the second controller 200B, and the second storage 200C. Subsequently, the circuit portion of the transceiver 200A uses the power generated by the received electromagnetic wave to generate a read request signal and a signal including the item information to be displayed on the display 106 by demodulating the electromagnetic wave.

Next, the second controller 200B acquires the request signal and the signal including the item information to be displayed on the display 106 from the circuit portion of the transceiver 200A (Step S302). The second controller 200B stores the item information to be displayed on the display 106 in the second storage 200C, based on the request signal.

Next, the second controller 200B transmits the item information to be displayed on the display 106, which has been stored in the second storage 200C, to the weight measurer 100 (Step S304). The first controller 102B of the weight measurer 100 stores the received item information to be displayed on the display 106 in the first storage 102C. Subsequently, the first controller 102B acquires the item information stored in the first storage 102C and displays the item information on the display 106.

Next, the second controller 200B acquires information related to the weight of the item from the weight measurer 100 and stores the information in the second storage 200C (Step S306).

Next, the second controller 200B causes the transceiver 200A to transmit a wireless signal including the information related to the weight of the item acquired from the second storage 200C to the wireless device 22 (Step S308).

In this manner, the transceiver 200A receives information related to the item to be displayed on the display 106 of the weight measurer 100 from the wireless device 22, and the second controller 200B transmits the received information related to the item to the weight measurer 100. The first controller 102B displays the item information on the display 106, based on the item information to be displayed on the display 106.

As described above, according to the present embodiment, not only a wireless signal including information related to the weight of the shelf 44 is transmitted to the wireless device 22 in response to a write request from the wireless device 22, but also the item information transmitted from the wireless device 22 is displayed on the display 106 of the weight measurer 100. Therefore, the display 106 can be effectively utilized.

First Modification

Figure 7:
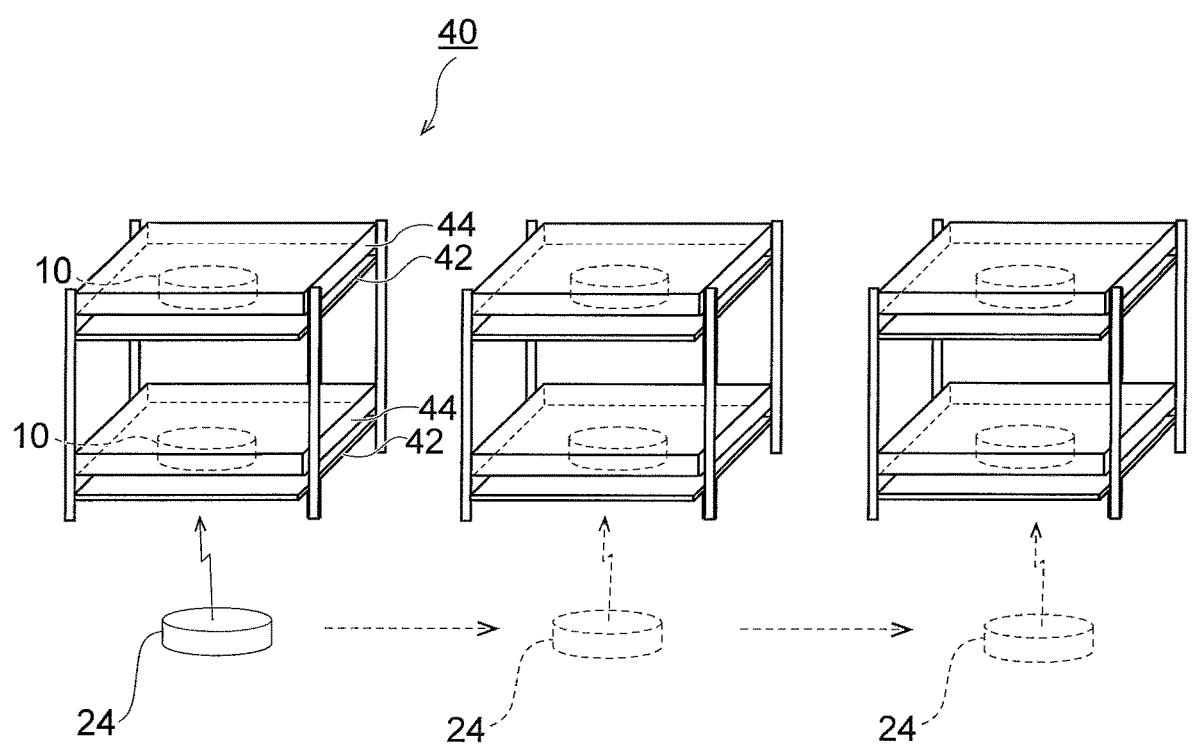
FIG. 7 is a diagram illustrating a running example in a case where a wireless device according to a first modification is provided in a self-running robot.

FIG. 7 is a diagram illustrating a running example in a case where a wireless device 24 according to a first modification is provided in a self-running robot. The wireless device 24 according to the first modification differs from the wireless device 22 according to the second embodiment in that the wireless device 24 is provided in at least one of a handy terminal, a self-running robot, and a shopping cart. Here, differences between the wireless device 24 according to the first modification and the wireless device 22 according to the second embodiment are described and explanations of other parts are omitted.

An arrow in FIG. 7 indicates a running direction of a self-running robot. The self-running robot is, for example, a cleaning robot. As illustrated in FIG. 7, the self-running robot including the wireless device 24 acquires information related to the weight respectively measured by a plurality of weight measurement systems 10, while circulating among the weight measurement systems 10. The wireless device 24 transmits a wireless signal including the pieces of information related to the weight measured by each of the weight measurement systems 10 to the inventory manager 30 (FIG. 5). In the present modification, the wireless device 24 is provided in a self-running robot; however, the wireless device 24 may be provided in either a handy terminal or a shopping cart. The handy terminal is not necessarily a dedicated terminal, and may be a general-purpose smartphone or tablet having a wireless function.

According to the modification example in FIG. 7, since the wireless device 24 can be downsized and incorporated not only in other portable devices, but also in a self-running robot or the like used for other applications, the wireless device 24 does not need to be prepared separately, and the weight of the shelf 44 can be easily acquired automatically.

Second Modification

Figure 8:
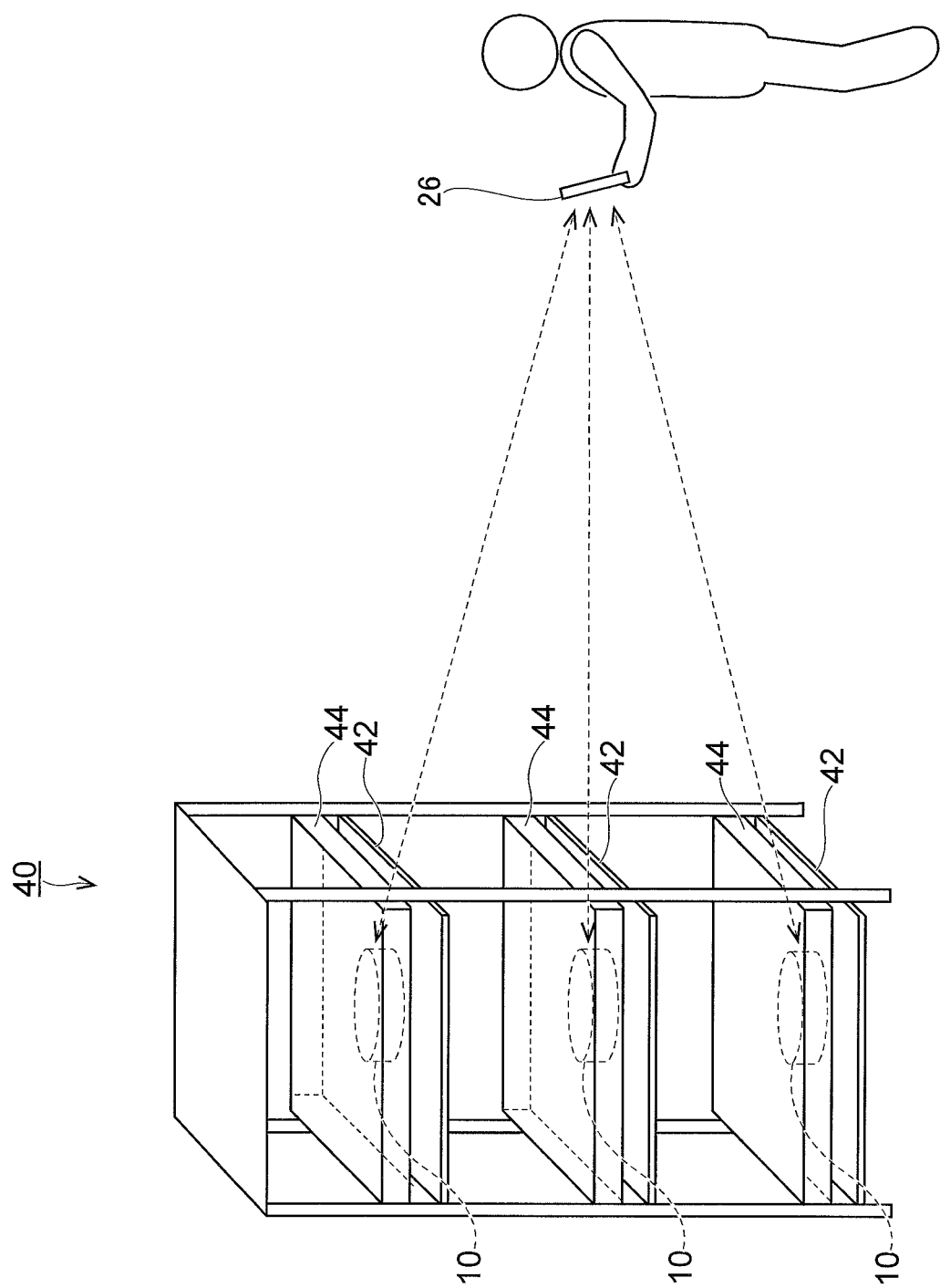
FIG. 8 is a schematic diagram illustrating an example in which a wireless device capable of performing long-distance communication is used.

FIG. 8 is a schematic diagram illustrating an example in which a wireless device 26 capable of performing long-distance communication is used. The wireless device 26 according to a second modification differs from the wireless device 22 according to the second embodiment in that long-distance communication is possible. Here, differences between the wireless device 26 according to the second modification and the wireless device 22 according to the second embodiment are described and explanations of other parts are omitted.

As illustrated in FIG. 8, the wireless device 26 and the transceiver 200A of the weight measurement system 10 (FIG. 5) transmit and receive a wireless signal to and from each other within a communication distance of 1 meter or more. That is, the wireless device 26 can perform communication of 1 meter or more, for example, up to 10 meters by adjusting, for example, a radio wave output.

As in FIG. 5, the weight measurer 100 and the RF tag 200 are provided in each of the weight measurement systems 10, and the wireless device 26 issues a read request to a plurality of weight measurers 100 and RF tags 200 at the same timing.

According to the modification example in FIG. 8, by using the wireless device 26 capable of performing long-distance communication, a read request to the weight measurement systems 10 can be issued at the same timing, thereby enabling to acquire information related to the weight more efficiently from the weight measurement systems 10.

The aspects of the present invention are not limited to each of the embodiments described above and include various modifications that occur to persons skilled in the art, and the effects of the present invention are also not limited to the contents described above. That is, various additions, changes, and partial omissions can be made without departing from the conceptual spirit and scope of the invention that are conceived of based upon the contents defined in the appended claims and equivalents thereof.

REFERENCE SIGNS LIST

1: inventory management system, 20: wireless device, 30: inventory manager, 44: shelf, 100: weight measurer, 106: display, 200: RF tag, 200A: transceiver, 200B: second controller, 200C: second storage.

The invention claimed is:

1. An inventory management system comprising:
a weight measurer configured to measure a weight of a shelf on which an item can be placed; and
an RF tag configured to transmit a wireless signal including information related to the weight measured by the weight measurer in response to a read request from a wireless device, wherein the RF tag includes
a transceiver configured to generate power by a received electromagnetic wave or a magnetic field and transmit the wireless signal to the wireless device by using the generated power,
a storage configured to store therein the information related to the weight measured by the weight measurer, and
a controller configured to cause the transceiver to transmit the wireless signal including the information related to the weight stored in the storage to the wireless device,
wherein the controller calculates a number of the items placed on the shelf based on the information related to the weight, and causes the transceiver to transmit the wireless signal including the information of the number to the wireless device.

2. The inventory management system of claim 1, wherein
the weight measurer measures a weight of the shelf regularly or irregularly,
the storage stores therein the weight of the shelf measured by the weight measurer regularly or irregularly, together with information related to a measurement time of the weight, and
the controller causes the transceiver to transmit the wireless signal including the information related to the weight stored in the storage, and the information related to the measurement time in response to a read request from the wireless device.

3. The inventory management system of claim 1, wherein
plural types of the items can be placed on the shelf,
the weight measurer measures a weight of the shelf regularly or irregularly, and
the controller calculates a number of the items placed on the shelf for each type of the items, based on a change in the weight measured by the weight measurer regularly or irregularly, stores the number of the items in the storage, and causes the transceiver to transmit the wireless signal including the number of the items for each type of the items, which is stored in the storage, in response to the read request from the wireless device.

4. The inventory management system of claim 3, wherein
the weight measurer measures a weight of the shelf based on an instruction signal from the controller, and
the controller transmits the instruction signal to the weight measurer based on at least one of a calculation result of the number of the items and environment conditions.

5. The inventory management system of claim 4, wherein the environment conditions include at least one of a weather, a temperature, a humidity, a time slot, a day of week, and a type of the items.

6. The inventory management system of claim 1, wherein the storage stores therein the information related to the weight by using power generated by the transceiver.

7. The inventory management system of claim 1, wherein the weight measurer includes a display capable of displaying the information related to the items placed on the shelf.

8. The inventory management system of claim 7, wherein
the transceiver receives the information related to the items to be displayed on the display from the wireless device,
the controller transmits the received information related to the items to the weight measurer, and
the weight measurer causes the display to display the information related to the items transmitted from the controller.

9. The inventory management system of claim 1, further comprising an inventory manager configured to manage the items placed on the shelf based on the wireless signal received by the wireless device.

10. The inventory management system of claim 1, wherein the wireless device is included in at least one of a handy terminal, a self-running robot, and a shopping cart.

11. The inventory management system of claim 1, wherein the wireless device and the transceiver transmit and receive the wireless signal to and from each other within a communication distance of 1 meter or more.

12. The inventory management system of claim 1, wherein
the weight measurer and the RF tag are provided in each of the shelves, and
the wireless device issues a read request to the RF tag of each of the shelves at a same timing.

13. A wireless tag device comprising:
a transceiver configured to generate power by an electromagnetic wave or a magnetic field received from a wireless device and transmit a wireless signal in response to a read request from the wireless device by using the generated power;
a storage configured to store therein information related to a weight of a shelf on which an item can be placed, which is measured by a weight measurer, by using power generated by the transceiver; and
a controller configured to cause the transceiver to transmit the wireless signal including the information related to the weight stored in the storage to the wireless device,
wherein the controller calculates a number of the items placed on the shelf based on the information related to the weight, and causes the transceiver to transmit the wireless signal including the information of the number to the wireless device.

14. The wireless tag device of claim 13, wherein
the weight measurer measures a weight of the shelf regularly or irregularly,
the storage stores therein the weight of the shelf measured by the weight measurer regularly or irregularly, together with information related to a measurement time of the weight, and the controller causes the transceiver to transmit the wireless signal including the information related to the weight stored in the storage, and the information related to the measurement time in response to the read request from the wireless device.

15. The wireless tag device of claim 13, wherein plural types of the items can be placed on the shelf, the weight measurer measures a weight of the shelf regularly or irregularly, and the controller calculates the number of the items placed on the shelf for each type of the items, based on a change in the weight measured by the weight measurer regularly or irregularly, stores the number of the items in the storage, and causes the transceiver to transmit the wireless signal including the number of the items for each type of the items, which is stored in the storage, in response to the read request from the wireless device.

16. The wireless tag device of claim 15, wherein the weight measurer measures a weight of the shelf based on an instruction signal from the controller, and the controller transmits the instruction signal to the weight measurer based on at least one of a calculation result of the number of the items and environment conditions.

17. The wireless tag device of claim 16, wherein the environment conditions include at least one of a weather, a temperature, a humidity, a time slot, a day of week, and a type of the items.

18. The wireless tag device of claim 13, wherein the storage stores therein the information related to the weight by using power generated by the transceiver.

* * * * *